US008652324B2

(12) United States Patent
Wietharn

(10) Patent No.: US 8,652,324 B2
(45) Date of Patent: Feb. 18, 2014

(54) SELF-CLEANING SCREEN ASSEMBLY FOR FILTERING IRRIGATION WATER

(76) Inventor: Robert J. Wietharn, Clay Center, KS (US)

(*) Notice: Subject to any disclaimer, the term of this patent is extended or adjusted under 35 U.S.C. 154(b) by 299 days.

(21) Appl. No.: 13/072,468

(22) Filed: Mar. 25, 2011

(65) Prior Publication Data
US 2011/0233132 A1 Sep. 29, 2011

Related U.S. Application Data

(60) Provisional application No. 61/317,620, filed on Mar. 25, 2010.

(51) Int. Cl.
| *B01D 33/073* | (2006.01) |
| *B01D 33/50* | (2006.01) |
| *B01D 33/80* | (2006.01) |
| *B01D 35/05* | (2006.01) |
| *B01D 33/06* | (2006.01) |

(52) U.S. Cl.
CPC .............. *B01D 33/073* (2013.01); *B01D 33/50* (2013.01); *B01D 33/801* (2013.01); *B01D 35/05* (2013.01); *B01D 2033/07* (2013.01)
USPC .............. 210/170.05; 210/170.09; 210/170.1; 210/242.1; 210/391; 210/402

(58) Field of Classification Search
USPC .................. 210/161, 170.01, 170.05, 170.09, 210/170.1, 242.1, 391, 393, 402
See application file for complete search history.

(56) References Cited

U.S. PATENT DOCUMENTS

| 1,473,667 | A | 11/1923 | Burks |
| 1,546,527 | A | 7/1925 | Werner |
| 4,017,394 | A | 4/1977 | Hensley |
| 4,261,822 | A | 4/1981 | Richardson |
| 4,515,180 | A | 5/1985 | Napolitano |
| 4,822,486 | A * | 4/1989 | Wilkins et al. ........... 210/170.09 |
| 5,240,383 | A | 8/1993 | Ames |
| 5,356,532 | A | 10/1994 | Wilkins et al. |
| 5,392,806 | A | 2/1995 | Gallant |

(Continued)

FOREIGN PATENT DOCUMENTS

JP 05-332464 12/1993

OTHER PUBLICATIONS

Riverscreen Product Brochure, 2005.

*Primary Examiner* — Christopher Upton
(74) *Attorney, Agent, or Firm* — Jeffrey L. Thompson; Thompson & Thompson, P.A.

(57) ABSTRACT

A self-cleaning screen includes a rotatable drum made of mesh material and an inlet pipe extending through a front end of the drum. A flotation structure supports the drum with the inlet pipe and the lower part of the drum submerged during use. A cleaning spray system located within the drum receives cleaning water through a hollow shaft supporting a rear end of the drum. Spray nozzles located within an upper part of the drum above the water level direct the cleaning water radially outward to dislodge debris from the screen. The front end of the drum includes an annular ring and a rubber seal extending radially inwardly from the annular ring to engage the inlet pipe. A drive belt extends around the annular ring to rotate the drum. A plurality of rollers engage an outer surface of the annular ring to support the drum for rotation about a horizontal axis.

20 Claims, 16 Drawing Sheets

(56) References Cited

U.S. PATENT DOCUMENTS

| | | | |
|---|---|---|---|
| 5,993,652 A | 11/1999 | Stoneburner et al. | |
| 6,270,669 B1 | 8/2001 | Bauer | |
| 6,783,330 B2 | 8/2004 | Carnes et al. | |
| 7,670,482 B2 | 3/2010 | Wietharn | |
| 2007/0227956 A1* | 10/2007 | Wietham | 210/161 |

* cited by examiner

SELF-CLEANING SCREEN ASSEMBLY FOR FILTERING IRRIGATION WATER

RELATED APPLICATIONS

This application claims priority of U.S. Provisional Application No. 61/317,620 filed on Mar. 25, 2010. The content of this prior application is incorporated herein by reference.

BACKGROUND OF THE INVENTION

1. Field of the Invention

The present invention relates generally to screening assemblies for filtering irrigation water to remove particulate matter from the water. In particular, the present invention relates to a screening assembly that uses a rotating drum-shaped screen with a self-cleaning feature to filter irrigation water.

2. Description of the Related Art

Centrifugal pumps and turbine pumps are commonly used to pump water out of outdoor pits, reservoirs, streams, rivers, ponds, lagoons, and the like, especially for irrigation purposes. Centrifugal pumps are often located above a water level of the water source and use a suction pipe or hose to draw water out of the water source to feed the pump. Turbine pumps have impellers placed below the water level and are usually fed by gravity flow of the water. Screens are typically used to prevent debris, sand and other objects from being sucked into the suction pipe for a centrifugal pump or from being drawn into the impellers of a turbine pump during operation.

Self-cleaning screens have been developed to prevent plugging by debris being drawn to the screen during pumping. An example of a self-cleaning screen is provided in U.S. Pat. No. 6,270,669 issued to Bauer. Another example of a self-cleaning screen is described in the Applicant's U.S. Pat. No. 7,670,482 and marketed by the Applicant under the proprietary name RIVERSCREEN™. These known products provide rotary self-cleaning drum strainers having a means for cleaning debris from a drum as the drum rotates during operation of the pump. The filtered water passing into the drum is drawn from the interior of the drum by a suction pipe or gravity fed pipe for delivery to an irrigation system.

The Applicant's '482 patent describes a self-cleaning screen that is designed to operate in shallow water with less than half of the screen submerged. For example, the '482 patent can be operated with only the lower quarter of the screen submerged, and is particularly suitable for use in rivers and streams with shallow, flowing water conditions. The screen is driven to rotate about its axis by the driving force of water flowing past the drum, or by a power drive system that sprays water against the outer surface of the drum during pump operation. A cleaning spray is also provided in the '482 patent by a conduit and spray nozzles positioned within the drum for spraying water in a radially outward direction to dislodge debris from the drum.

There is a need in the industry for an improved self-cleaning screen assembly that is particularly suitable for pumping conditions in which more than half of the screen is submerged.

SUMMARY OF THE INVENTION

The present invention provides a self-cleaning screen assembly having a positive drive mechanism and an improved seal and support assembly for use in pumping conditions in which more than half of the screen is submerged.

To accomplish these and other objects of the present invention, a self-cleaning screen assembly is provided that includes a rotatable drum made of mesh material and an inlet pipe extending through a front end of the drum. The front end of the drum includes an annular ring and a rubber seal extending radially inwardly from the annular ring to engage the inlet pipe to create a seal between the outer surface of the inlet pipe and the rotating drum. An endless belt extends around the annular ring and is driven by an electric motor to rotate the drum. A plurality of rollers engage and roll on a portion of the annular ring beside the belt to support the first end of the drum for allowing the drum to rotate about a horizontal axis.

A flotation structure and support structure supports the rotatable drum so that approximately the lower 70 percent of the drum is submerged during use, or so that the inlet pipe and the lower part of the drum are submerged and an upper part of the drum remains above the water level. A cleaning spray system located within the drum receives cleaning water through a hollow shaft supporting a rear end of the drum. Spray nozzles located within the drum are arranged above the water level to direct the cleaning water radially outwardly to dislodge debris stuck to the screen.

Numerous other objects and features of the present invention will be apparent to those skilled in this art from the following description wherein there is shown and described exemplary embodiments of the present invention, simply by way of illustration of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

Figure 1:
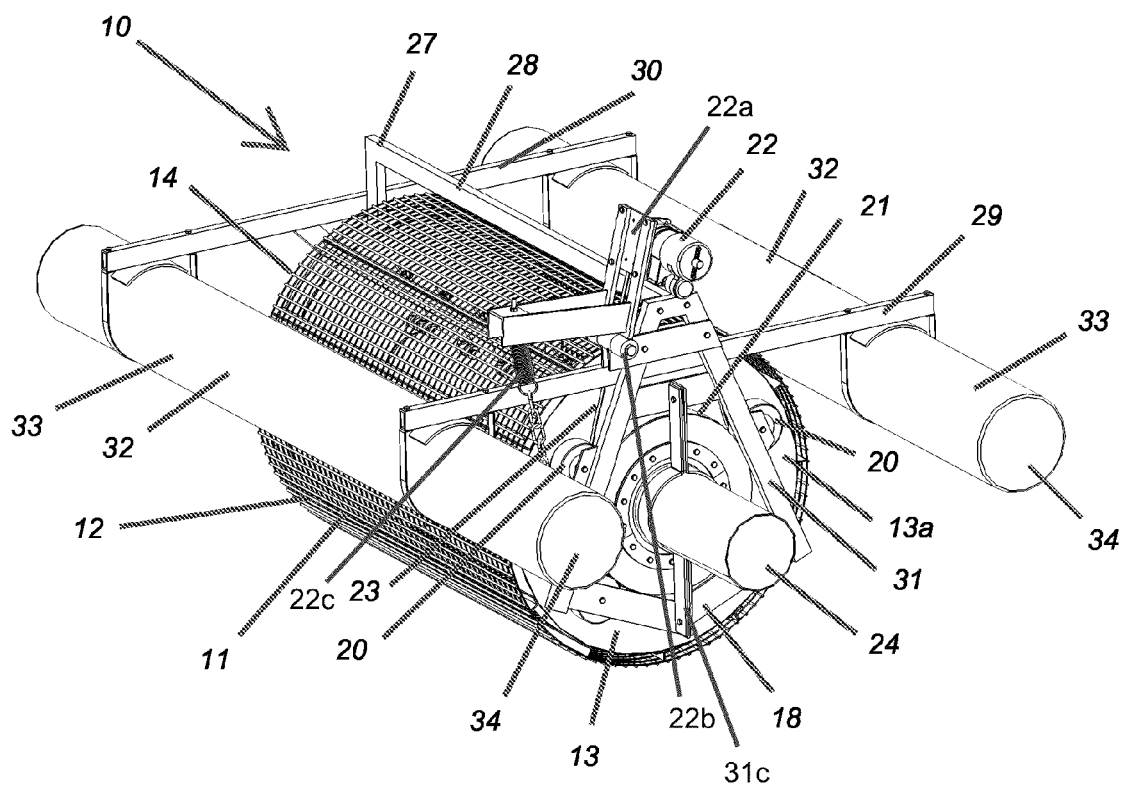
FIG. 1 is a perspective view of a self-cleaning screen assembly having a positive drive mechanism for a rotatable drum and an improved seal and support assembly for use in pumping conditions in which the inlet pipe and the lower part of the drum are submerged and an upper part of the drum remains above the water level.
Figure 2:
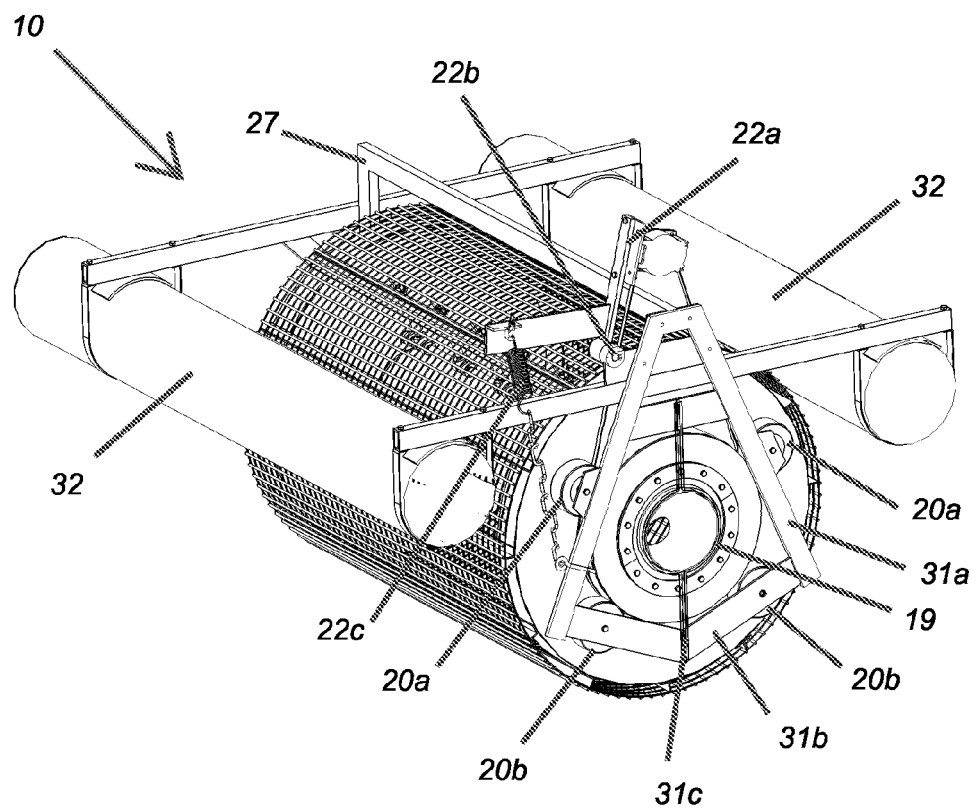
FIG. 2 is a cross sectional perspective view of the self-cleaning screen assembly shown in FIG. 1.
Figure 3:
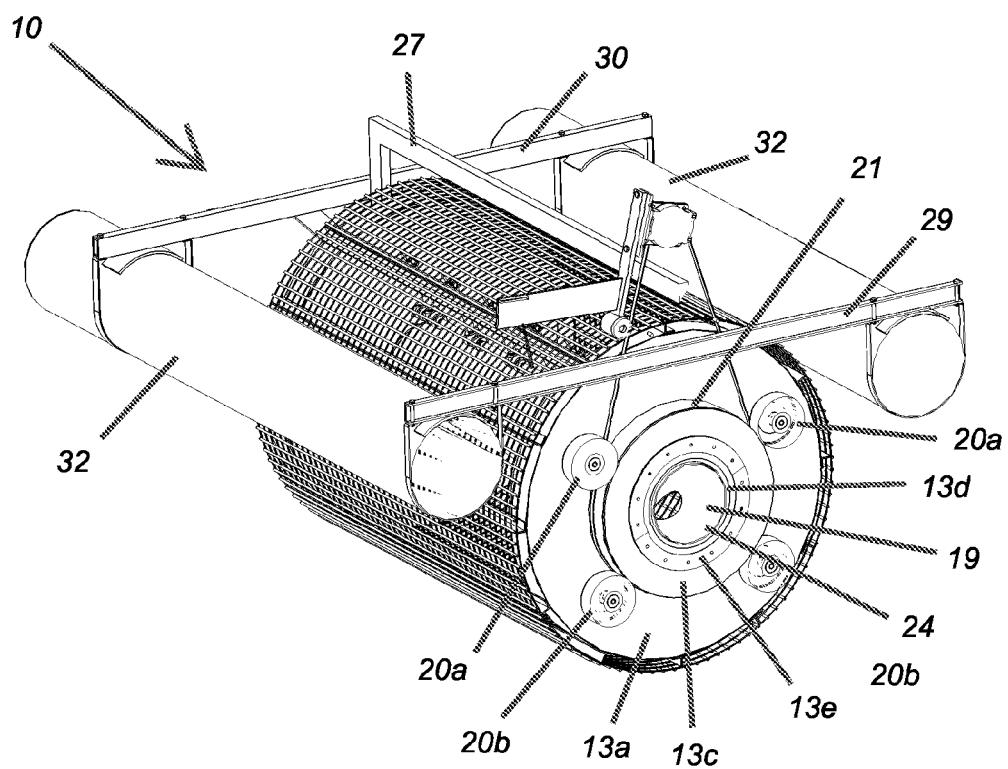
FIG. 3 is another cross sectional perspective view of the self-cleaning screen assembly shown in FIG. 1.
Figure 4:
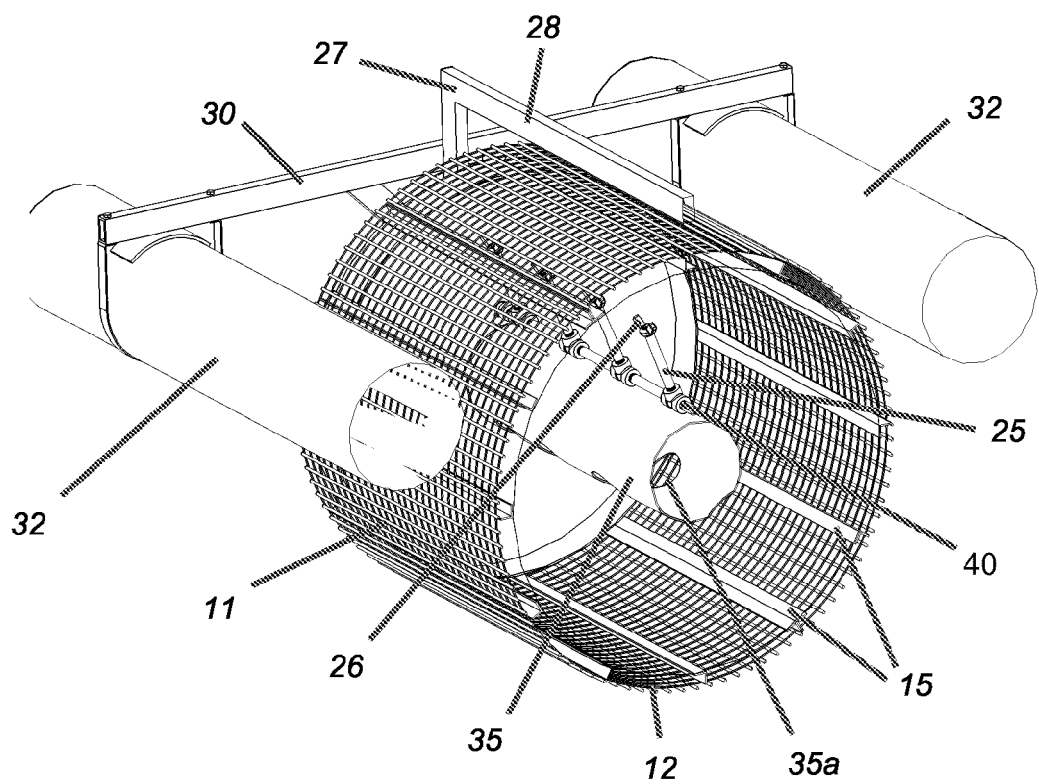
FIG. 4 is another cross sectional perspective view of the self-cleaning screen assembly shown in FIG. 1.
Figure 5:
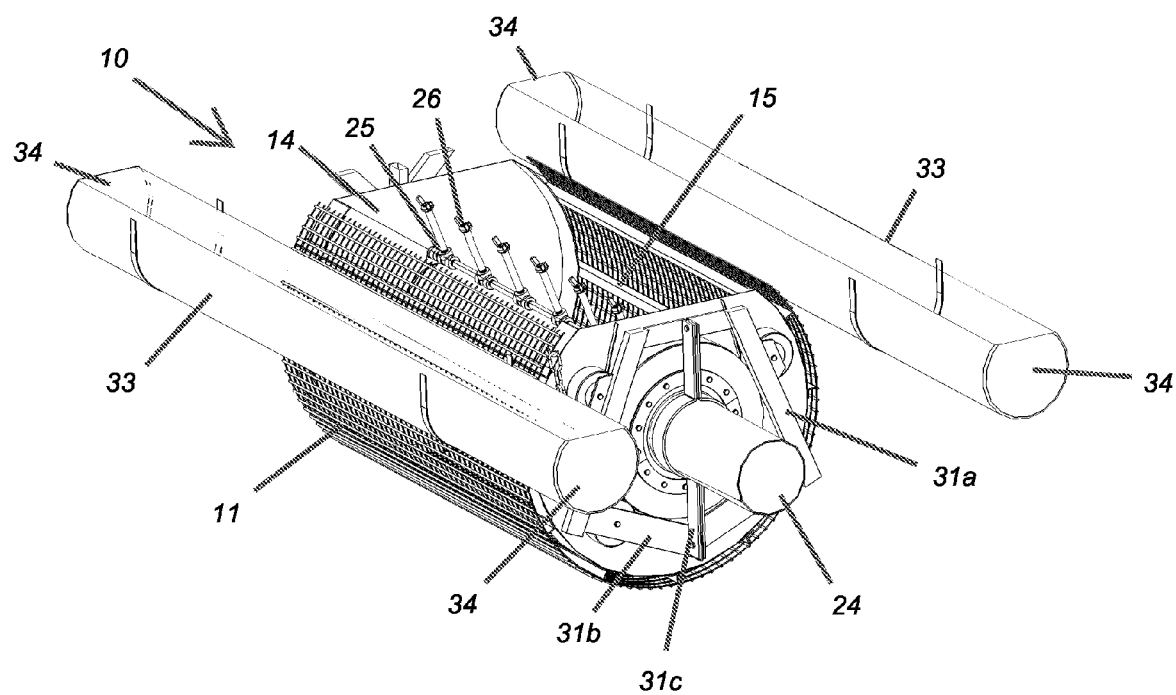
FIG. 5 is another cross sectional perspective view of the self-cleaning screen assembly shown in FIG. 1.
Figure 6:
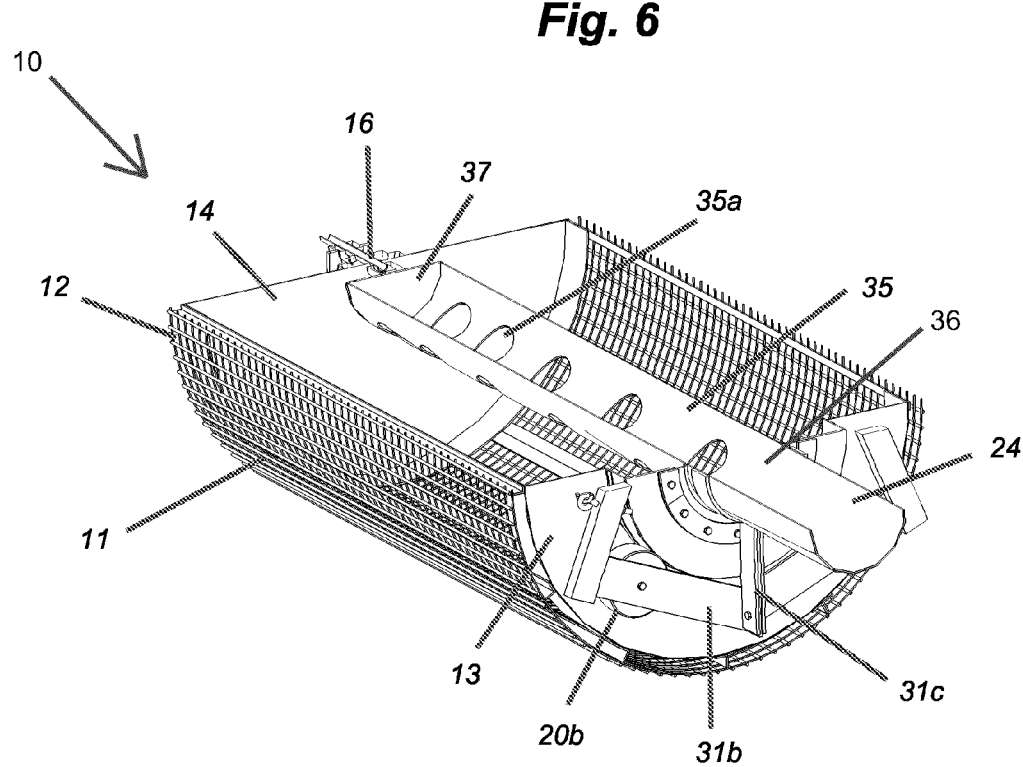
FIG. 6 is another cross sectional perspective view of the self-cleaning screen assembly shown in FIG. 1.
Figure 7:
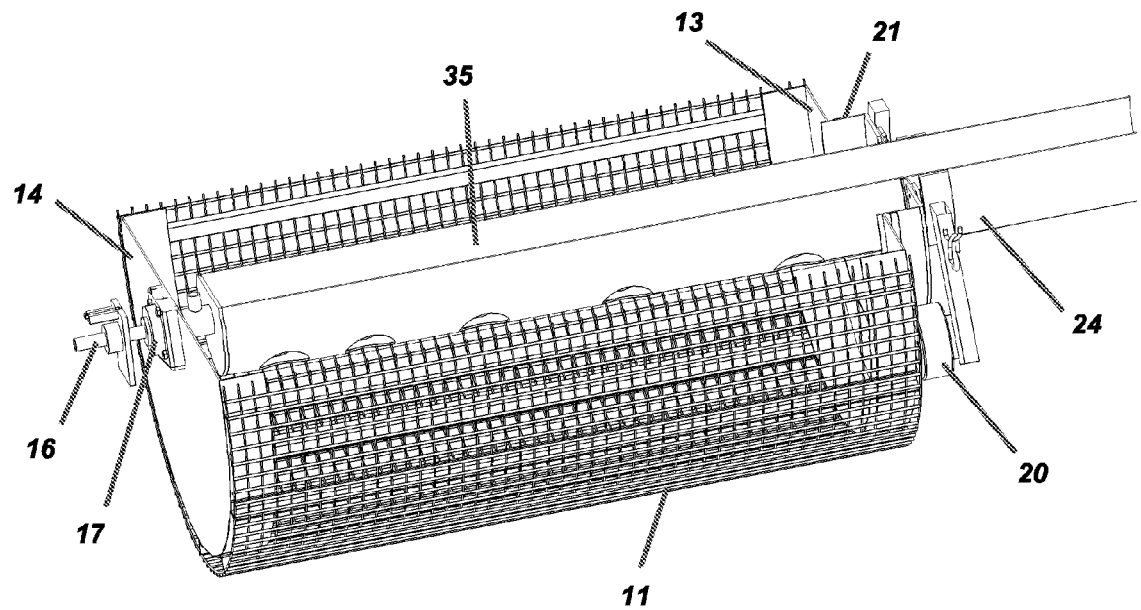
FIG. 7 is another cross sectional view of the self-cleaning screen assembly, as viewed from a different perspective.
Figure 8:
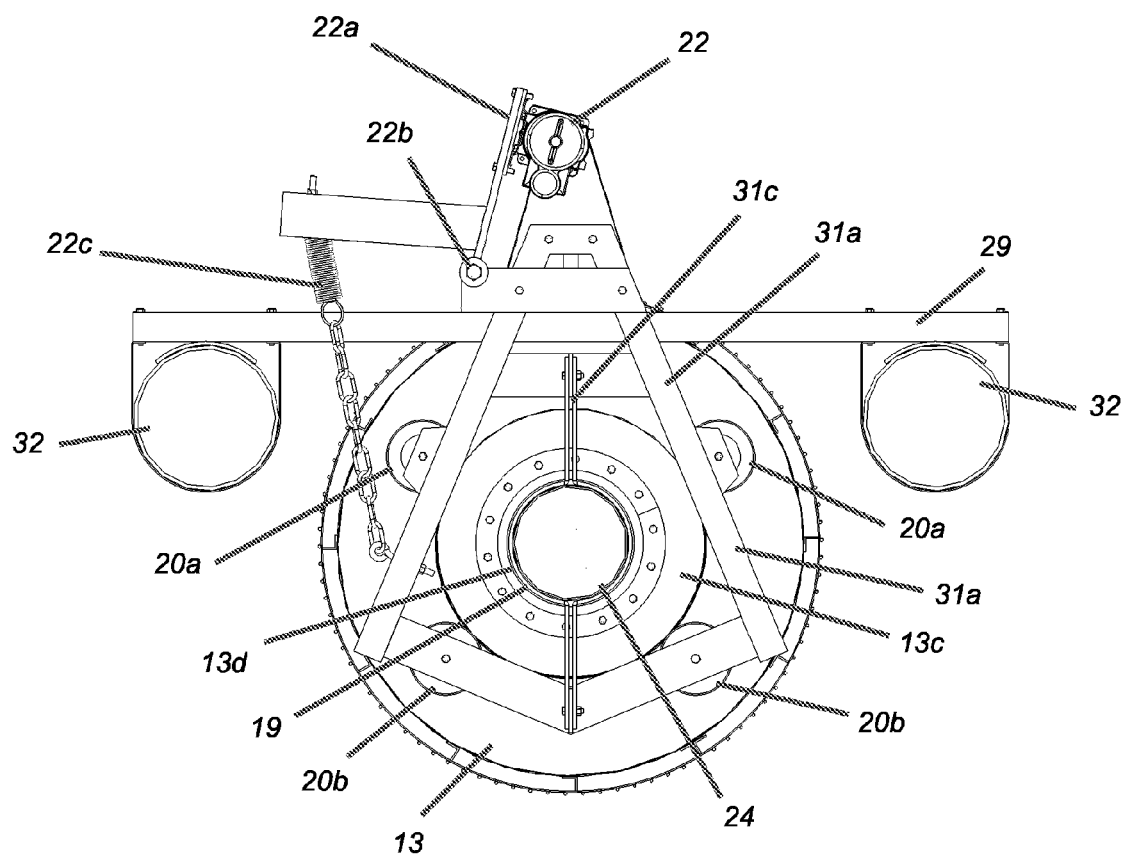
FIG. 8 is a front elevation view of the self-cleaning screen assembly.
Figure 9:
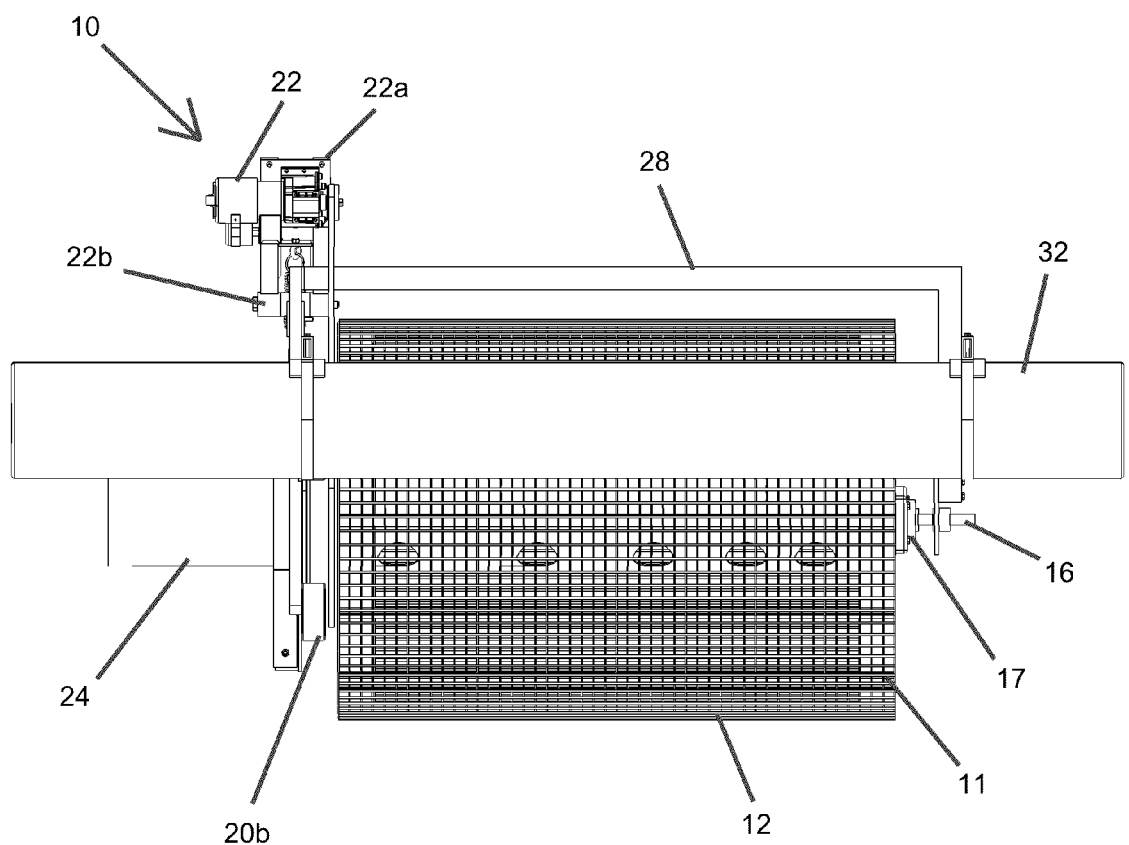
FIG. 9 is a side elevation view of the self-cleaning screen assembly.
Figure 10:
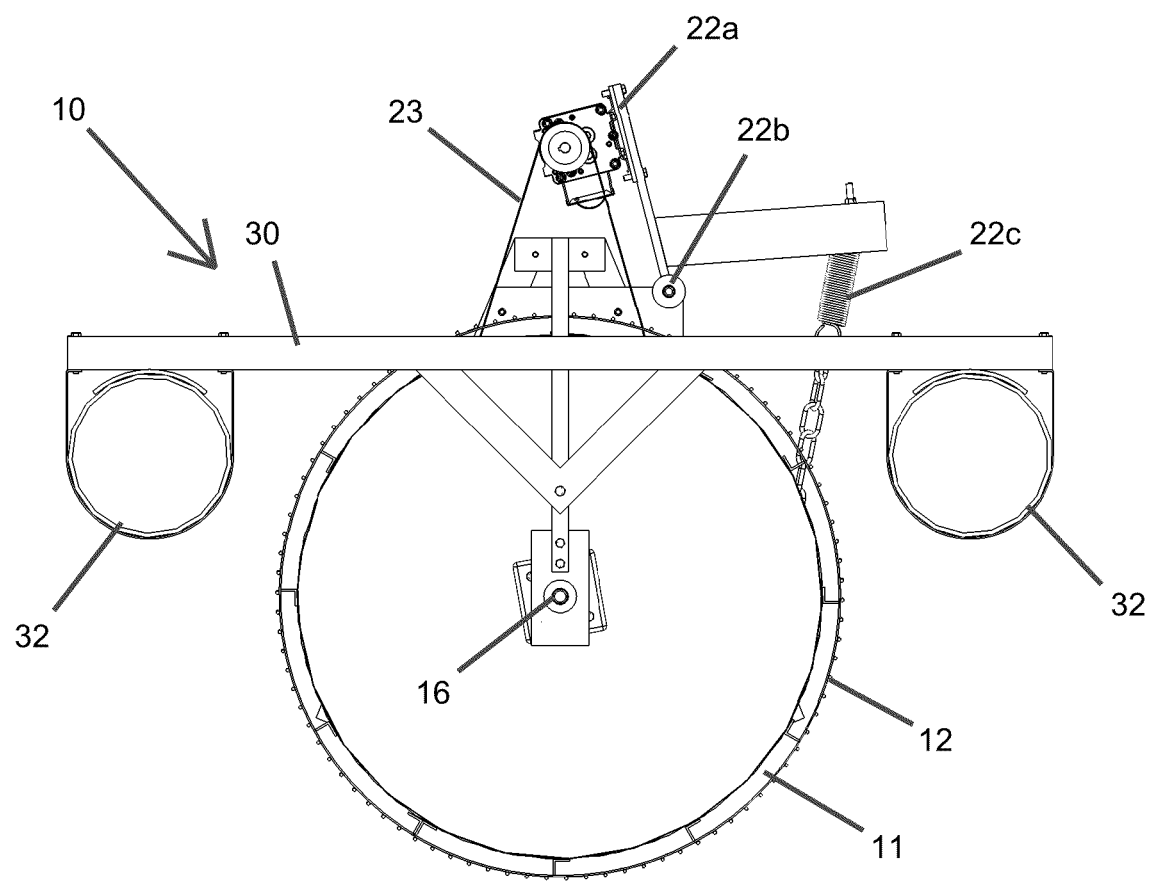
FIG. 10 is a rear elevation view of the self-cleaning screen assembly.
Figure 11:
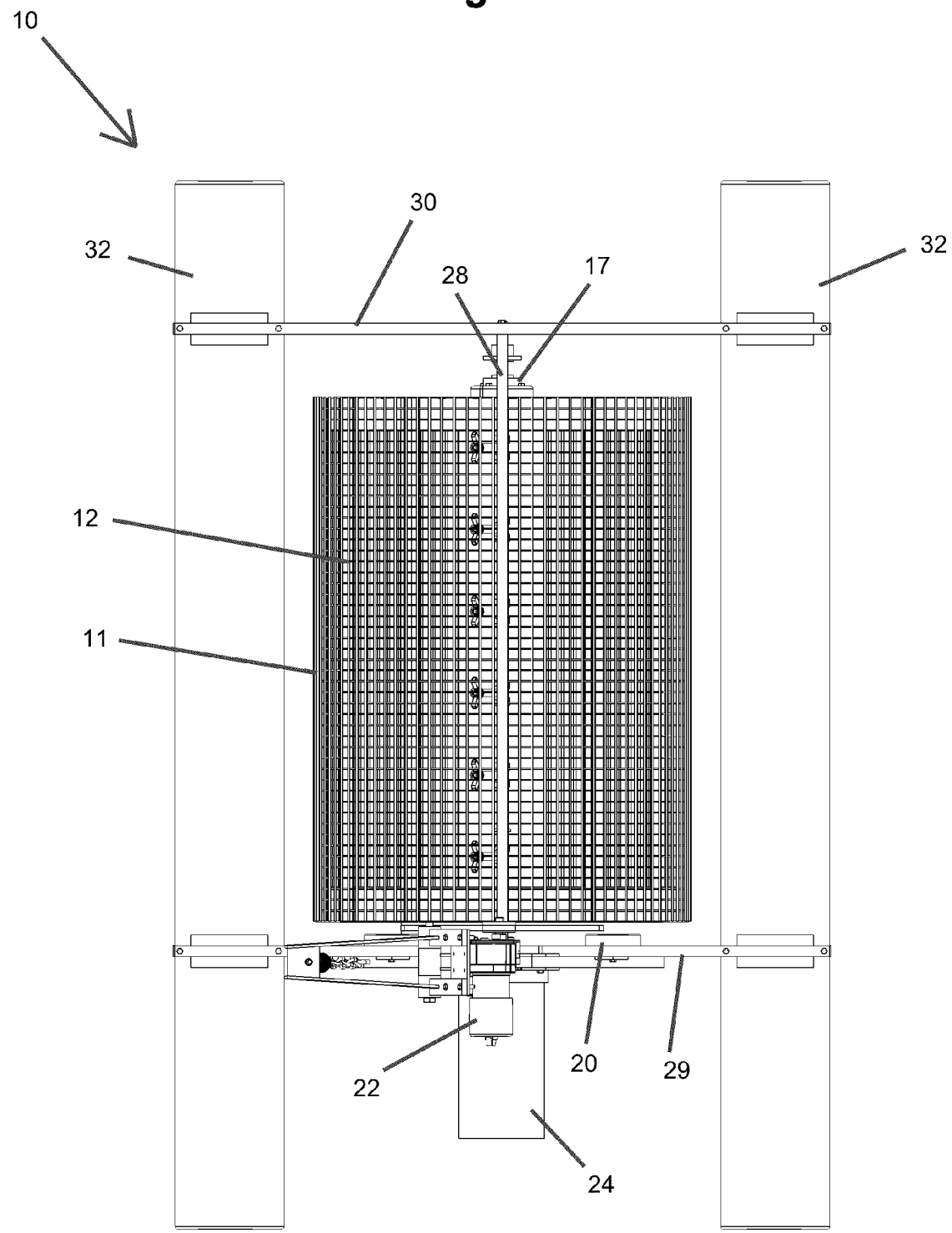
FIG. 11 is a top plan view of the self-cleaning screen assembly.
Figure 12:
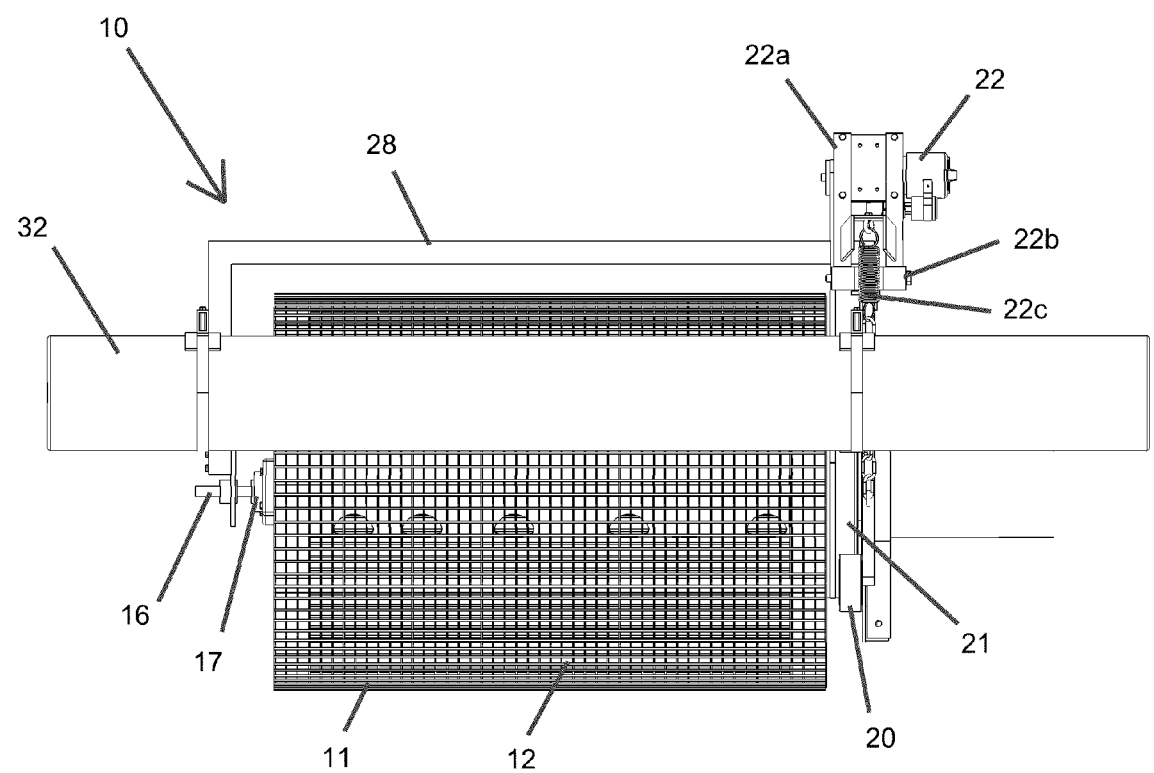
FIG. 12 is another side elevation view of the self-cleaning screen assembly.
Figure 13:
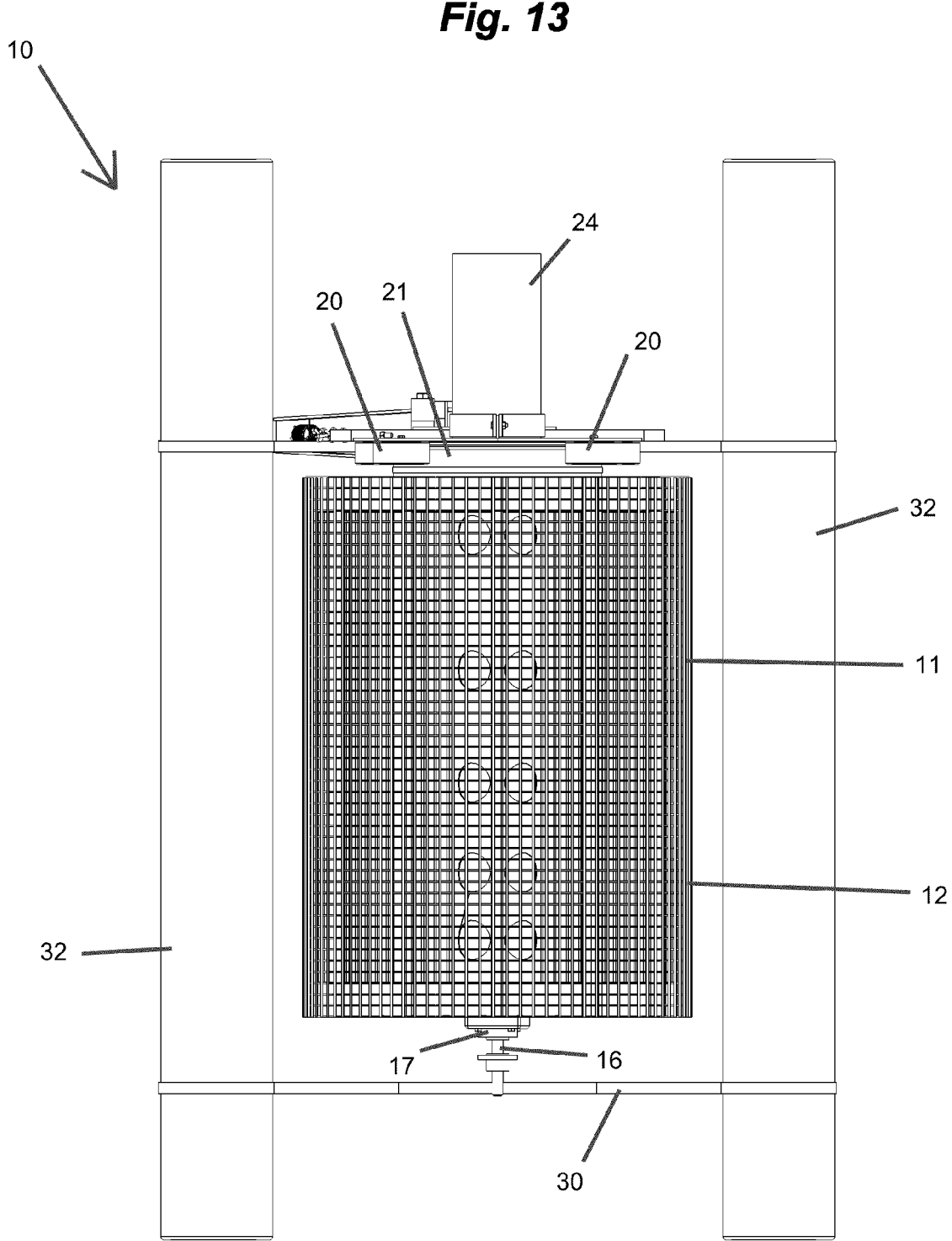
FIG. 13 is a bottom plan view of the self-cleaning screen assembly.
Figure 14:
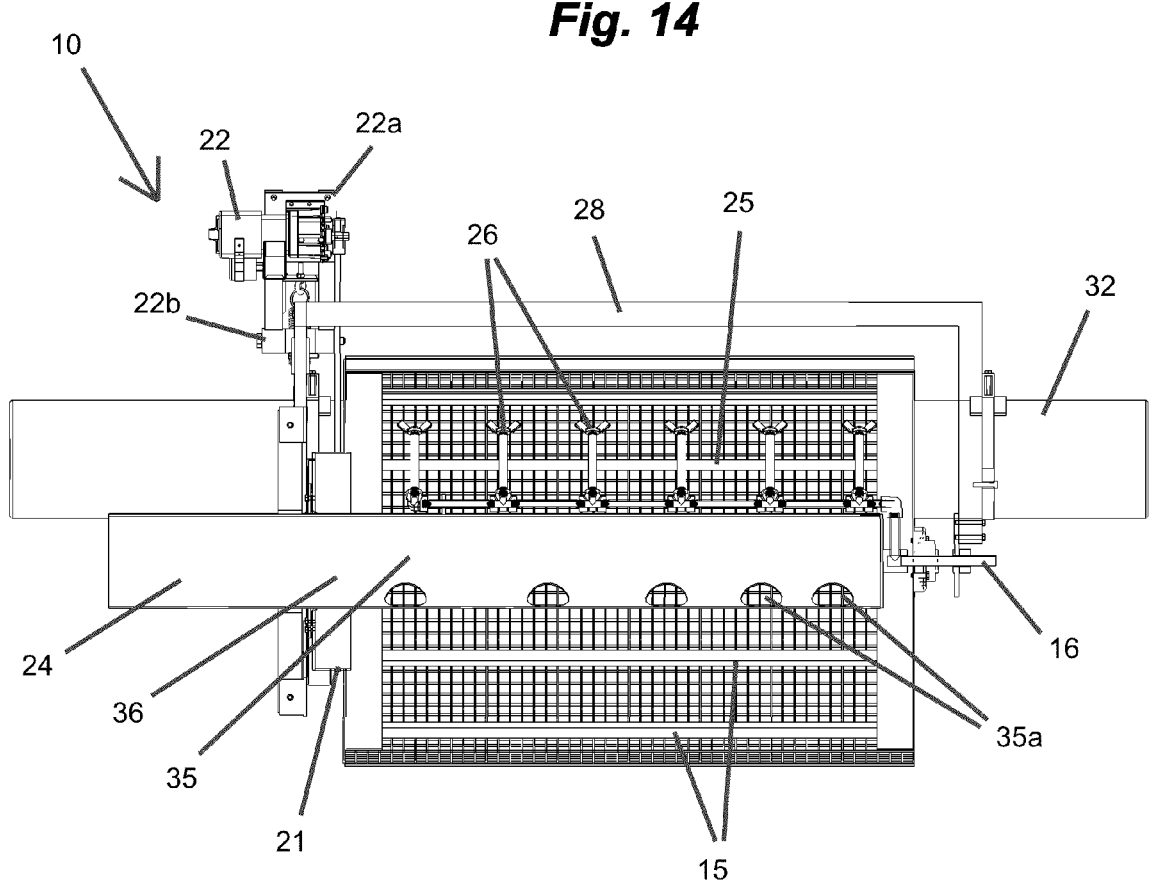
FIG. 14 is a cross sectional elevation view of the self-cleaning screen assembly.
Figure 15:
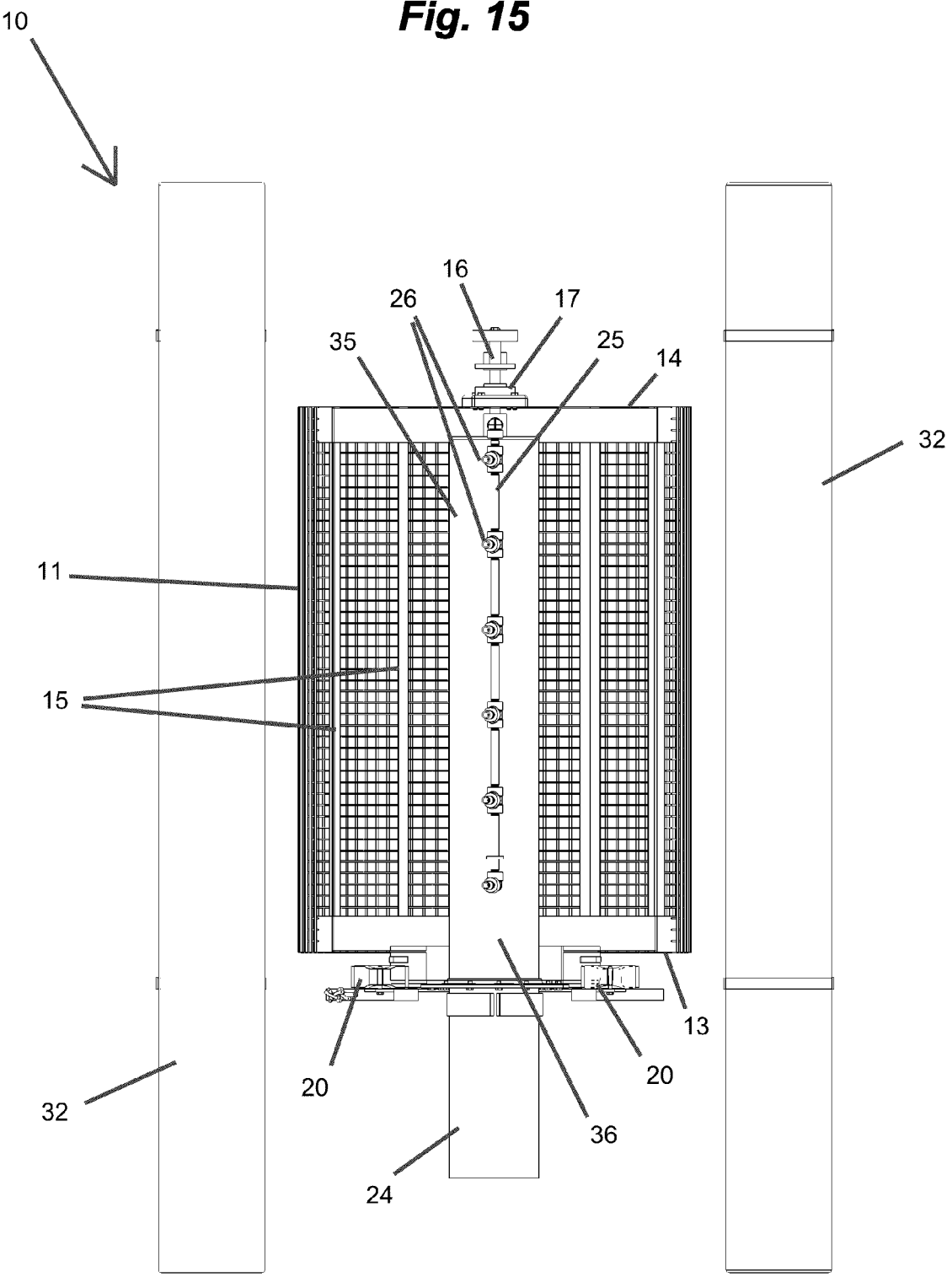
FIG. 15 is a cross sectional plan view of the self-cleaning screen assembly.
Figure 16:
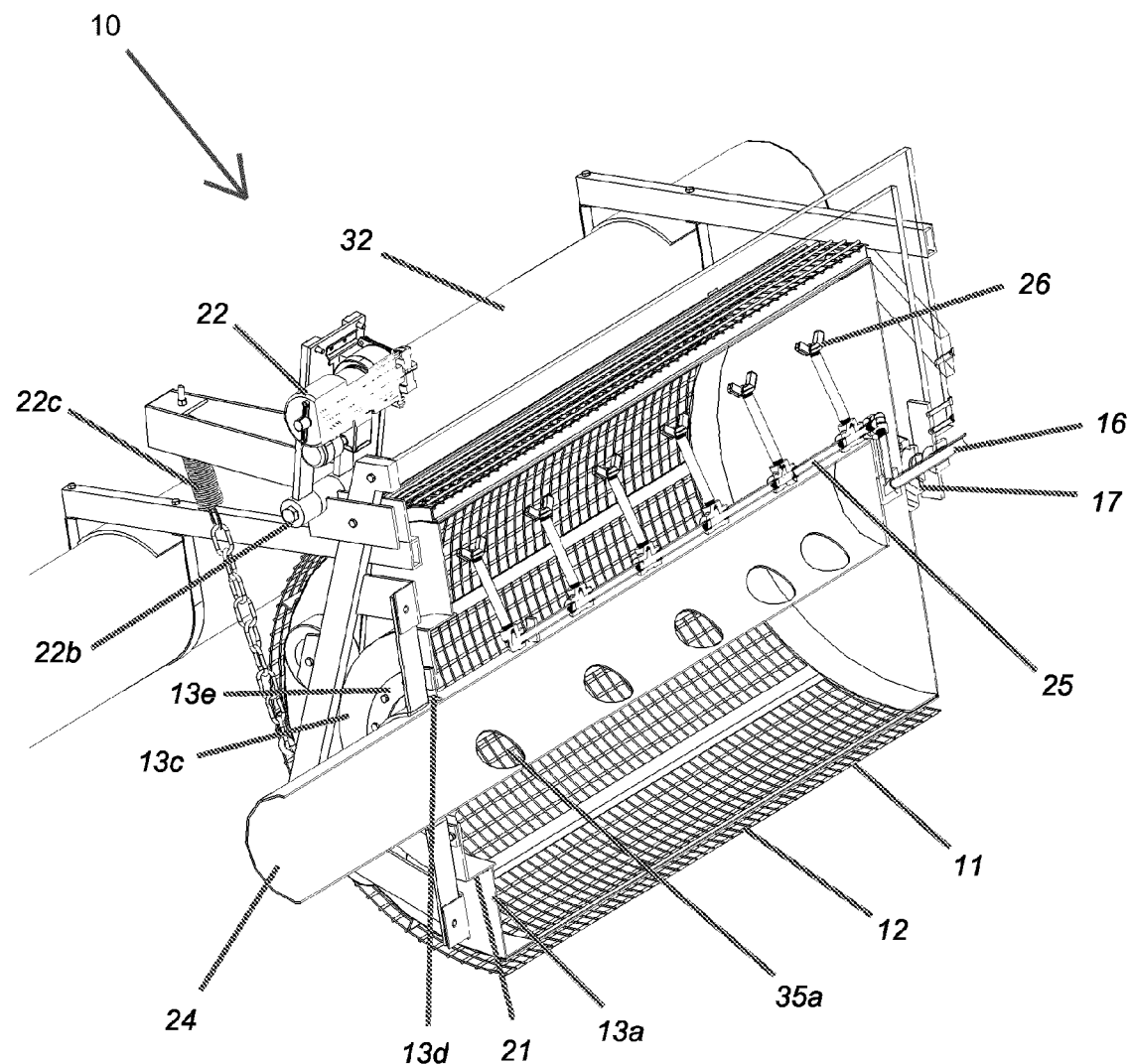
FIG. 16 is another cross sectional perspective view of the self-cleaning screen assembly.

A self-cleaning screen assembly 10 according to the present invention will now be described in detail with reference to FIGS. 1 to 16 of the accompanying drawings.

The self-cleaning screen assembly 10 includes a rotatable drum 11 having a sidewall 12 made of a mesh material for removing debris from water as the water passes into the drum 11. The mesh material of the sidewall 12 can be, for example, 150 mesh material, although various other sizes and materials can be used to fit particular pumping and screening applications. For example, the mesh material 12 can be selected to match a filtering requirement for drip tape emitters used in a drip irrigation system.

The drum 11 has a front end 13 and a rear end 14 and a plurality of slat members 15 extending along a length of the drum 11 between the front and rear ends 13, 14. The mesh sidewall 12 of the drum 11 extends between the front and rear ends 13, 14 and is supported by the slat members 15 to maintain a cylindrical shape.

The front end 13 of the drum 11 is supported by a support structure 18 that allows the drum 11 to rotate about a horizontal axis. The front end 13 of the drum 11 has an opening 19 through which an inlet pipe 24 can be passed to draw water from the interior of the drum 11. The inlet pipe 24 can be connected to a suction pipe or gravity flow inlet pipe for a pumping unit (not shown). The drum 11 rotates around the inlet pipe 24, which remains stationary.

The front end 13 of the drum 11 has an end face 13a and an annular ring 21 protruding in an axial direction from an inner periphery of the end face 13a. The annular ring 21 can be, for example, a rolled structure having a width in an axial direction of approximately two to three inches.

A front face 13c extends radially inwardly from a front edge of the annular ring 21. A seal member 13d is attached to the front face 13c using a plate member 13e or other suitable structure to clamp the seal member 13d to the front face 13c. The seal member 13d can be, for example, a flap of flexible rubber material. The seal member 13d extends radially inwardly from the front face 13c of the drum 11 to engage and maintain a contact seal between an outer surface of the inlet pipe 24 and the drum 11 as the drum 11 rotates around the inlet pipe 24. The seal member 13d functions to prevent unscreened water and debris from passing into the drum 11.

The support structure 18 for supporting the front end 13 of the drum 11 includes a plurality of rollers 20 that support an outer surface of the annular ring 21 to allow the drum 11 to rotate about its horizontal axis while being supported by the rollers 20. In a preferred embodiment, the plurality of rollers 20 comprises at least three, and preferably four, support wheels that rotate on individual axes parallel to the axis of rotation of the drum 11. A first pair of the support wheels 20a are arranged above the horizontal axis of rotation of the drum 11, and a second pair of the support wheels 20b are arranged below the horizontal axis of the drum 11. The first and second pairs of support wheels 20a, 20b provide support on opposing sides of the annular ring 21.

An electric drive motor 22 is used to rotate the drum 11 during use. An endless belt 23, such as a V-belt, extends around a drive pulley on an output shaft of the motor 22 and the annular ring 21 on the drum 11 to rotate the drum 11 when the motor 22 is operated. The support wheels 20 engage and roll on the annular ring 21 beside the belt 23.

The rear end 14 of the drum 11 is supported by a hollow shaft 16 and bearing 17 or other suitable structure to allow the drum 11 to rotate freely about a horizontal axis during operation.

The drum 11 is supported by a framework 27 that includes a main beam 28 extending the length of the drum 11, and cross pieces 29, 30 positioned at each end of the main beam 28. Additional frame members 31 are used to connect the cross pieces 29, 30 to the drum 11 for added support and rigidity. The additional frame members 31 at the front of the drum 11 include a first pair of supports 31a that form an upside-down V-shape with an apex at the top and legs extending downwardly on each side of the annular ring 21. The first pair of support wheels 20a are mounted to the legs of the supports 31a. A second pair of supports 31b extend from the lower ends of the supports 31a and are connected together at an apex beneath the inlet pipe 24. The second pair of support wheels 20b are mounted to the supports 31b for engaging the annular ring 21 below the axis of rotation of the drum 11. A support member 31c is connected between the upper and lower supports 31a, 31b to hold the inlet pipe 24 in a fixed position relative to the framework 27.

The electric drive motor 22 is supported above the apex of the supports 31a by a motor mount 22a with a pivot axis 22b that allows the tension on the drive belt 23 to be adjusted. A chain and spring assembly 22c are provided to maintain a desired tension on the drive belt 23 during operation.

The framework 27 is supported by a floatation structure 32, such as a plurality of floats, connected to the cross pieces 29, 30 to ensure that the drum 11 operates at a desired depth in the water source. The floatation structure 32 can be aluminum pipe members 33 with caps 34 on the ends to make the pipe members 33 airtight and buoyant. The floatation structure 32 can also have an alternative construction, such as one or more foam-filled or airtight plastic containers or the like.

In a preferred embodiment, the floatation structure 32 supports the drum 11 in a water source so that the inlet pipe 24 and the lower part (e.g., approximately 70%) of the rotatable drum 11 is submerged and an upper part of the drum 11 remains above the water level. The floatation structure 32 prevents the drum 11 from being submerged too deep or too shallow. If the drum 11 is submerged too deep, it might engage the bottom of the water source and prevent rotation of the drum 11 during operation. If the drum 11 is submerged too deep, it can also reduce the effectiveness of the cleaning spray system described below. On the other hand, if the drum 11 is submerged too shallow, the water flow through the mesh material 12 into the drum 11 may be restricted, especially when using mesh material having very small openings, because the water can only flow into the drum 11 through that portion of the mesh material 12 that is submerged.

A cleaning spray system 40 is positioned within the drum 11. The cleaning spray system 40 is connected to the hollow shaft 16 so that cleaning water can be passed into the drum 11 through the hollow shaft 16 and the bearing 17 at the rear end 14 of the drum 11. The cleaning spray system 40 includes a conduit 25 and a plurality of spray nozzles 26. The spray nozzles 26 are located within the drum 11 above the inlet pipe 24 and above a normal water level in the drum 11 so that the cleaning water can be sprayed in the atmosphere above the water level. Spraying the cleaning water in the atmosphere, rather than below the water level, substantially improves the effectiveness of the cleaning spray system 40.

The spray nozzles 26 are directed to spray water in a radially outward direction from within the drum 11 so that the sprayed water impinges against the inside surface and mesh openings of the mesh material 12. The cleaning spray from the spray nozzles 26 functions to dislodge any debris stuck to the mesh material 12 of the drum 11 as the drum 11 rotates to provide a continuous, self-cleaning action on the drum 11. The cleaning spray can be supplied, for example, by diverting a portion of the water being pumped from the pressure side of the pump back to the cleaning spray system 40.

A portion 35 of the inlet pipe 24 is positioned within the drum 11 for collecting and feeding the filtered water through the pipe 24 to a pump (not shown) or other water use application. The portion 35 is also referred to herein as the "inlet chamber 35." The inlet pipe 24 and inlet chamber 35 are mounted stationary with the support framework 27 so that the inlet chamber 35 remains stationary as the drum 11 rotates around it. The inlet chamber 35 is supported at its one end 36 by a rigid coupling or integral construction with the inlet pipe 24, and is supported at its other end 37 by the hollow shaft 16 and bearing 17 supporting the first end of the drum 11. In the illustrated embodiment, the inlet chamber 35 is integral with the inlet pipe 24, but other constructions can also be used in which the inlet chamber 35 is a separate component connected to the inlet pipe 24. The inlet chamber 35 has at least one and preferably a plurality of inlet openings 35a formed across its lower side for allowing filtered water from within the drum 11 to pass into the inlet chamber 35 and the inlet pipe 24 during use. The inlet openings 35a serve as a baffle to keep water flowing evenly across the length of the drum 11, which improves the filtering efficiency and flow capacity of the drum 11.

In operation, the self-cleaning screen assembly 10 of the present invention is placed in a water source, and the inlet pipe 24 is connected to a suction pipe or gravity flow inlet pipe for an irrigation pump or other suitable water use system. During operation, irrigation water free flows into the drum 11 through the mesh sidewall 12, and the filtered water is drawn or flows by gravity through the inlets 35a into the inlet chamber 35 and the inlet pipe 24. The water then passes from the inlet pipe 24 into the pipe or other structure that feeds the irrigation pump or other water use system. Also during operation, the drum 11 is rotatably driven about its horizontal axis by the electric drive motor 22, and the cleaning spray system 40 sprays water against the mesh material 12 in the atmosphere above the water level of the water source to dislodge any debris stuck to the mesh material 12 as the drum 11 rotates.

It will be appreciated that various changes can be made in the embodiment described above without departing from the present invention. For example, the structure and support for the rotating drum 11 can be changed. Also, it will be appreciated that the invention can be used for pumping fluids other than water and for purposes other than irrigation, and that the terms "water" and "irrigation" as used throughout the specification and claims herein should be construed as covering all such fluids and pumping uses. Also, the terms "inlet pipe" and "suction pipe" used throughout the specification and claims should be construed as covering any pipe, hose or other similar structure used to supply water from a water source requiring filtration.

While the invention has been specifically described in connection with specific embodiments thereof, it is to be understood that this is by way of illustration and not of limitation, and the scope of the appended claims should be construed as broadly as the prior art will permit.

What is claimed is:

1. A self-cleaning screen assembly, comprising:
   a rotatable drum comprising a screen for removing debris from water as the water passes into the drum, said rotatable drum having a front end and a rear end, and said screen extending between said front and rear ends;
   an inlet pipe that passes through said front end of the rotatable drum, said inlet pipe having at least one inlet opening for receiving screened water from within the drum; and
   a seal means provided between said front end of the rotatable drum and an outer surface of said inlet pipe for preventing unscreened water and debris from passing into the drum, said seal means comprising a flap secured to said front end of the rotatable drum, said flap being arranged to extend radially inwardly to maintain contact with an outer surface of the inlet pipe as the drum rotates relative to the inlet pipe;
   wherein said front end of the drum comprises an end face, an annular ring protruding in an axial direction from an inner periphery of said end face, said annular ring being coaxial with an axis of rotation of the drum, and said flap extending radially inwardly from said annular ring to maintain a seal between said drum and an outer surface of said inlet pipe; and
   further comprising a support structure for rotatably supporting said front end of the rotatable drum, said support structure comprising a plurality of rollers that engage and support a surface of said annular ring to allow said drum to rotate about a horizontal axis while being supported by said rollers.

2. The self-cleaning screen assembly according to claim 1, wherein said flap is a flexible rubber flap.

3. The self-cleaning screen assembly according to claim 1, wherein said rollers comprise a first pair of rollers arranged above said horizontal axis of rotation of said drum, and a second pair of rollers arranged below said horizontal axis.

4. The self-cleaning screen assembly according to claim 1, further comprising a drive assembly for rotatably driving said drum during operation, said drive assembly comprising an endless belt extending around an outer surface of said annular ring and a drive pulley.

5. The self-cleaning screen assembly according to claim 1, wherein said surface of said annular ring comprises an outer surface of said annular ring.

6. A self-cleaning screen assembly, comprising:
   a rotatable drum comprising a screen for removing debris from water as the water passes into the drum, said rotatable drum having a front end and a rear end, and said screen extending between said front and rear ends;
   a support structure for rotatably supporting said rotatable drum for rotation about a horizontal axis;
   an inlet pipe that passes through said front end of the rotatable drum, said inlet pipe having at least one inlet opening for receiving screened water from within the drum;
   a flotation means for supporting said support structure and said rotatable drum in a water source with said horizontal axis of rotation located below a normal water level so that said inlet pipe and a lower part of the rotatable drum are completely submerged and an upper part of the drum remains above said normal water level; and
   a cleaning spray system positioned within said rotatable drum, said cleaning spray system comprising a plurality of spray nozzles located within said drum directed to spray water in a radially outward direction to dislodge debris stuck to the screen, said spray nozzles being located above the normal water level in said drum so that cleaning water can be sprayed in the atmosphere above the water level.

7. The self-cleaning screen assembly according to claim 6, wherein said flotation means is made to support said rotatable drum with approximately 70% of the drum submerged in the water source.

8. The self-cleaning screen assembly according to claim 6, wherein said screen comprises a mesh material having 150 mesh or smaller openings.

9. The self-cleaning screen assembly according to claim 6, further comprising a seal means provided between said front end of the rotatable drum and an outer surface of said inlet pipe for preventing unscreened water and debris from passing into the drum, said seal means comprising a flap secured to said front end of the rotatable drum, said flap being arranged to extend radially inwardly to maintain contact with an outer surface of the inlet pipe as the drum rotates relative to the inlet pipe.

10. The self-cleaning screen assembly according to claim 9, wherein said front end of the drum comprises an end face, an annular ring protruding in an axial direction from an inner periphery of said end face, said annular ring being coaxial with an axis of rotation of the drum, and said flap extending radially inwardly from said annular ring to maintain a seal between said drum and an outer surface of said inlet pipe.

11. The self-cleaning screen assembly according to claim 10, further comprising a drive assembly for rotatably driving said drum during operation, said drive assembly comprising an endless belt extending around an outer surface of said annular ring and a drive pulley.

12. The self-cleaning screen assembly according to claim 6, wherein said surface of said annular ring comprises an outer surface of said annular ring.

13. A self-cleaning screen assembly, comprising:
a rotatable drum comprising a screen for removing debris from water as the water passes into the drum, said rotatable drum having a front end and a rear end, and said screen extending between said front and rear ends;
an inlet pipe that passes through said front end of the rotatable drum, said inlet pipe having at least one inlet opening for receiving screened water from within the drum;
a flotation means for supporting said rotatable drum in a water source so that said inlet pipe and a lower part of the rotatable drum are submerged and an upper part of the drum remains above a normal water level;
a cleaning spray system positioned within said rotatable drum, said cleaning spray system comprising a plurality of spray nozzles located within said drum directed to spray water in a radially outward direction to dislodge debris stuck to the screen, said spray nozzles being located above the normal water level in said drum so that cleaning water can be sprayed in the atmosphere above the water level;
a seal means provided between said front end of the rotatable drum and an outer surface of said inlet pipe for preventing unscreened water and debris from passing into the drum, said seal means comprising a flap secured to said front end of the rotatable drum, said flap being arranged to extend radially inwardly to maintain contact with an outer surface of the inlet pipe as the drum rotates relative to the inlet pipe;
wherein said front end of the drum comprises an end face, an annular ring protruding in an axial direction from an inner periphery of said end face, said annular ring being coaxial with an axis of rotation of the drum and said flap extending radially inwardly from said annular ring to maintain a seal between said drum and an outer surface of said inlet pipe; and
further comprising a support structure for rotatably supporting said front end of the rotatable drum, said support structure comprising a plurality of rollers that engage and support a surface of said annular ring to allow said drum to rotate about a horizontal axis while being supported by said rollers.

14. The self-cleaning screen assembly according to claim 13, wherein said rollers comprise a first pair of rollers arranged above said horizontal axis of rotation of said drum, and a second pair of rollers arranged below said horizontal axis.

15. A self-cleaning screen assembly, comprising:
a rotatable drum comprising a screen for removing debris from water as the water passes into the drum, said rotatable drum having a front end and a rear end, and said screen extending between said front and rear ends;
an inlet pipe that passes through said front end of the rotatable drum, said inlet pipe having at least one inlet opening for receiving screened water from within the drum;
said front end of the drum comprising an end face, an annular ring protruding in an axial direction from an inner periphery of said end face, said annular ring being coaxial with an axis of rotation of the drum, and a seal means extending radially inwardly from said annular ring to maintain a seal between said drum and an outer surface of said inlet pipe; and
a support structure for rotatably supporting said front end of the rotatable drum, said support structure comprising a plurality of rollers that engage and support a surface of said annular ring to allow said drum to rotate about a horizontal axis while being supported by said rollers.

16. The self-cleaning screen assembly according to claim 15, further comprising a drive assembly for rotatably driving said drum during operation, said drive assembly comprising an endless belt extending around an said outer surface of said annular ring and a drive pulley.

17. The self-cleaning screen assembly according to claim 15, wherein said rollers comprise a first pair of rollers arranged above said horizontal axis of rotation of said drum, and a second pair of rollers arranged below said horizontal axis.

18. The self-cleaning screen assembly according to claim 15, further comprising a flotation means for supporting said rotatable drum in a water source so that said inlet pipe and a lower part of the rotatable drum are submerged and an upper part of the drum remains above a normal water level, and further comprising a cleaning spray system positioned within said rotatable drum, said cleaning spray system comprising a plurality of spray nozzles located within said drum directed to spray water in a radially outward direction to dislodge debris stuck to the screen, said spray nozzles being located above the normal water level in said drum so that cleaning water can be sprayed in the atmosphere above the water level.

19. The self-cleaning screen assembly according to claim 15, wherein said screen comprises a mesh material having 150 mesh or smaller openings.

20. The self-cleaning screen assembly according to claim 15, wherein said surface of said annular ring comprises an outer surface of said annular ring.

* * * * *